(12) United States Patent
Zha

(10) Patent No.: US 11,384,961 B2
(45) Date of Patent: Jul. 12, 2022

(54) COOLING SYSTEM

(71) Applicant: Heatcraft Refrigeration Products LLC, Stone Mountain, GA (US)

(72) Inventor: Shitong Zha, Snellville, GA (US)

(73) Assignee: Heatcraft Refrigeration Products LLC, Stone Mountain, GA (US)

( * ) Notice: Subject to any disclaimer, the term of this patent is extended or adjusted under 35 U.S.C. 154(b) by 127 days.

(21) Appl. No.: 15/994,245

(22) Filed: May 31, 2018

(65) Prior Publication Data

US 2019/0368791 A1 Dec. 5, 2019

(51) Int. Cl.
| | |
|---|---|
| F25B 49/02 | (2006.01) |
| F25B 1/10 | (2006.01) |
| F25B 41/20 | (2021.01) |
| F25B 41/34 | (2021.01) |
| F25B 41/385 | (2021.01) |

(52) U.S. Cl.
CPC ............... *F25B 1/10* (2013.01); *F25B 41/20* (2021.01); *F25B 41/34* (2021.01); *F25B 49/02* (2013.01); *F25B 41/385* (2021.01); *F25B 2341/068* (2013.01); *F25B 2345/006* (2013.01); *F25B 2600/2513* (2013.01)

(58) Field of Classification Search
CPC .. F25B 41/062; F25B 49/02; F25B 2341/065; F25B 2600/2513; F25B 2345/005
See application file for complete search history.

(56) References Cited

U.S. PATENT DOCUMENTS 1,515,648 A * 11/1924 Arnold .................. F25B 41/062
137/505.35
1,591,301 A * 7/1926 Ford ...................... B25B 27/26
29/215
1,616,129 A * 2/1927 Knox .................... F25B 41/062
236/92 R
(Continued)

FOREIGN PATENT DOCUMENTS

DE 102015112439 A1 2/2017
EP 1686330 A2 8/2006
(Continued)

OTHER PUBLICATIONS

European Patent Office, Extended European Search Report, Application No. 19173693.3, dated Oct. 24, 2019, 7 pages.

*Primary Examiner* — Larry L Furdge
*Assistant Examiner* — Alexis K Cox
(74) *Attorney, Agent, or Firm* — Baker Botts L.L.P.

(57) ABSTRACT

An apparatus includes a flash tank, a first low side heat exchanger, a second low side heat exchanger, a first compressor, a second compressor, an expansion valve, a desuperheater, a sensor, and a controller. The first compressor compresses a refrigerant from the second low side heat exchanger. The desuperheater removes heat from the refrigerant from the first compressor. The second compressor compresses a mixture of the refrigerant from the first low side heat exchanger and the refrigerant from the first compressor. The expansion valve, actionable by the sensor and the controller, controls a flow of the refrigerant to the first low side heat exchanger such that the flow of refrigerant to the first low side heat exchanger is increased when a temperature of the mixture exceeds a threshold.

10 Claims, 3 Drawing Sheets

(56) References Cited

U.S. PATENT DOCUMENTS

| | | | | |
|---|---|---|---|---|
| 1,769,859 | A * | 7/1930 | Roberts | F25B 5/02 236/92 R |
| 3,220,639 | A * | 11/1965 | Chew | F25B 31/00 417/243 |
| 3,234,749 | A * | 2/1966 | Quick | F24F 3/001 62/129 |
| 3,234,752 | A * | 2/1966 | Quick | F25B 47/022 62/192 |
| 4,554,799 | A * | 11/1985 | Pallanch | F25B 1/10 417/243 |
| 4,660,384 | A * | 4/1987 | Pallanch | F25B 47/022 62/151 |
| 4,947,655 | A | 8/1990 | Shaw | |
| 5,236,311 | A * | 8/1993 | Lindstrom | F04B 25/00 417/254 |
| 2001/0027664 | A1 * | 10/2001 | Ross | F25B 40/04 62/513 |
| 2003/0121274 | A1 * | 7/2003 | Wightman | F16K 3/03 62/222 |
| 2004/0200233 | A1 * | 10/2004 | Funakoshi | F25B 41/26 62/498 |
| 2008/0196421 | A1 * | 8/2008 | Rossi | F25B 49/00 62/127 |
| 2015/0345835 | A1 * | 12/2015 | Martin | F25B 9/008 62/238.3 |
| 2017/0159977 | A1 * | 6/2017 | Hellmann | F25B 9/08 |
| 2019/0203980 | A1 * | 7/2019 | Cavalleri | F25B 5/02 |
| 2021/0061067 | A1 * | 3/2021 | Kim | B60H 1/3213 |

FOREIGN PATENT DOCUMENTS

| | | |
|---|---|---|
| EP | 3144603 A1 | 3/2017 |
| EP | 3144604 A1 | 3/2017 |

* cited by examiner

COOLING SYSTEM

TECHNICAL FIELD

This disclosure relates generally to a cooling system, such as a refrigeration system.

BACKGROUND

Cooling systems are used to cool spaces, such as residential dwellings, commercial buildings, and/or refrigeration units. These systems cycle a refrigerant (also referred to as charge) that is used to cool the spaces.

SUMMARY OF THE DISCLOSURE

A typical commercial refrigeration system includes a medium temperature section (e.g., produce shelves) and a low temperature section (e.g., freezers). A low temperature compressor compresses the refrigerant from the low temperature section. A medium temperature compressor compresses a mixture of the refrigerant from the medium temperature section and the compressed refrigerant from the low temperature compressor. Thus, the temperature of the refrigerant from the low temperature section and the temperature of the refrigerant from the medium temperature section affect the temperature of the mixture received at the medium temperature compressor.

A problem occurs in existing systems when the low temperature section is being used much more heavily or frequently than the medium temperature section. In these instances, there is not enough refrigerant from the medium temperature section mixing with the hot refrigerant from the low temperature compressor. As a result, the temperature of the mixture rises, which hurts the performance of the medium temperature compressor.

This disclosure contemplates an unconventional cooling system that increases the flow of refrigerant to the medium temperature section when the temperature of the mixture at the medium temperature compressor exceeds a threshold. By increasing the flow of refrigerant to the medium temperature section, the refrigerant leaving the medium temperature section cools. Then, that refrigerant cools the mixture entering the medium temperature compressor. As a result, the performance of the medium temperature compressor is improved. Certain embodiments of the system will be described below.

According to an embodiment, an apparatus includes a flash tank, a first low side heat exchanger, a second low side heat exchanger, a first compressor, a second compressor, and an expansion valve. The flash tank stores a refrigerant. The first low side heat exchanger uses the refrigerant from the flash tank to cool a space proximate the first low side heat exchanger. The second low side heat exchanger uses the refrigerant from the flash tank to cool a space proximate the second low side heat exchanger. The first compressor compresses the refrigerant from the second low side heat exchanger. The second compressor compresses a mixture of the refrigerant from the first low side heat exchanger and the refrigerant from the first compressor. The expansion valve controls a flow of the refrigerant from the flash tank to the first low side heat exchanger such that the flow of refrigerant to the first low side heat exchanger is increased when a temperature of the mixture exceeds a threshold.

According to another embodiment, a method includes storing, by a flash tank, a refrigerant. The method also includes using, by a first low side heat exchanger, the refrigerant from the flash tank to cool a space proximate the first low side heat exchanger and using, by a second low side heat exchanger, the refrigerant from the flash tank to cool a space proximate the second low side heat exchanger. The method further includes compressing, by a first compressor, the refrigerant from the second low side heat exchanger and compressing, by a second compressor, a mixture of the refrigerant from the first low side heat exchanger and the refrigerant from the first compressor. The method also includes controlling, by an expansion valve, a flow of the refrigerant from the flash tank to the first low side heat exchanger such that the flow of refrigerant to the first low side heat exchanger is increased when a temperature of the mixture exceeds a threshold.

According to yet another embodiment, a system includes a high side heat exchanger, a flash tank, a first low side heat exchanger, a second low side heat exchanger, a first compressor, a second compressor, and an expansion valve. The high side heat exchanger removes heat from a refrigerant. The flash tank stores the refrigerant from the high side heat exchanger. The first low side heat exchanger uses the refrigerant from the flash tank to cool a space proximate the first low side heat exchanger. The second low side heat exchanger uses the refrigerant from the flash tank to cool a space proximate the second low side heat exchanger. The first compressor compresses the refrigerant from the second low side heat exchanger. The second compressor compresses a mixture of the refrigerant from the first low side heat exchanger and the refrigerant from the first compressor and to direct the compressed mixture to the high side heat exchanger. The expansion valve controls a flow of the refrigerant from the flash tank to the first low side heat exchanger such that the flow of refrigerant to the first low side heat exchanger is increased when a temperature of the mixture exceeds a threshold.

Certain embodiments provide one or more technical advantages. For example, an embodiment reduces the temperature of a refrigerant at the suction of a medium temperature compressor when a medium temperature low side heat exchanger is not being used as heavily or as frequently as a low temperature low side heat exchanger. As another example, an embodiment improves the performance of a compressor by cooling a refrigerant mixture at the suction of the compressor. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
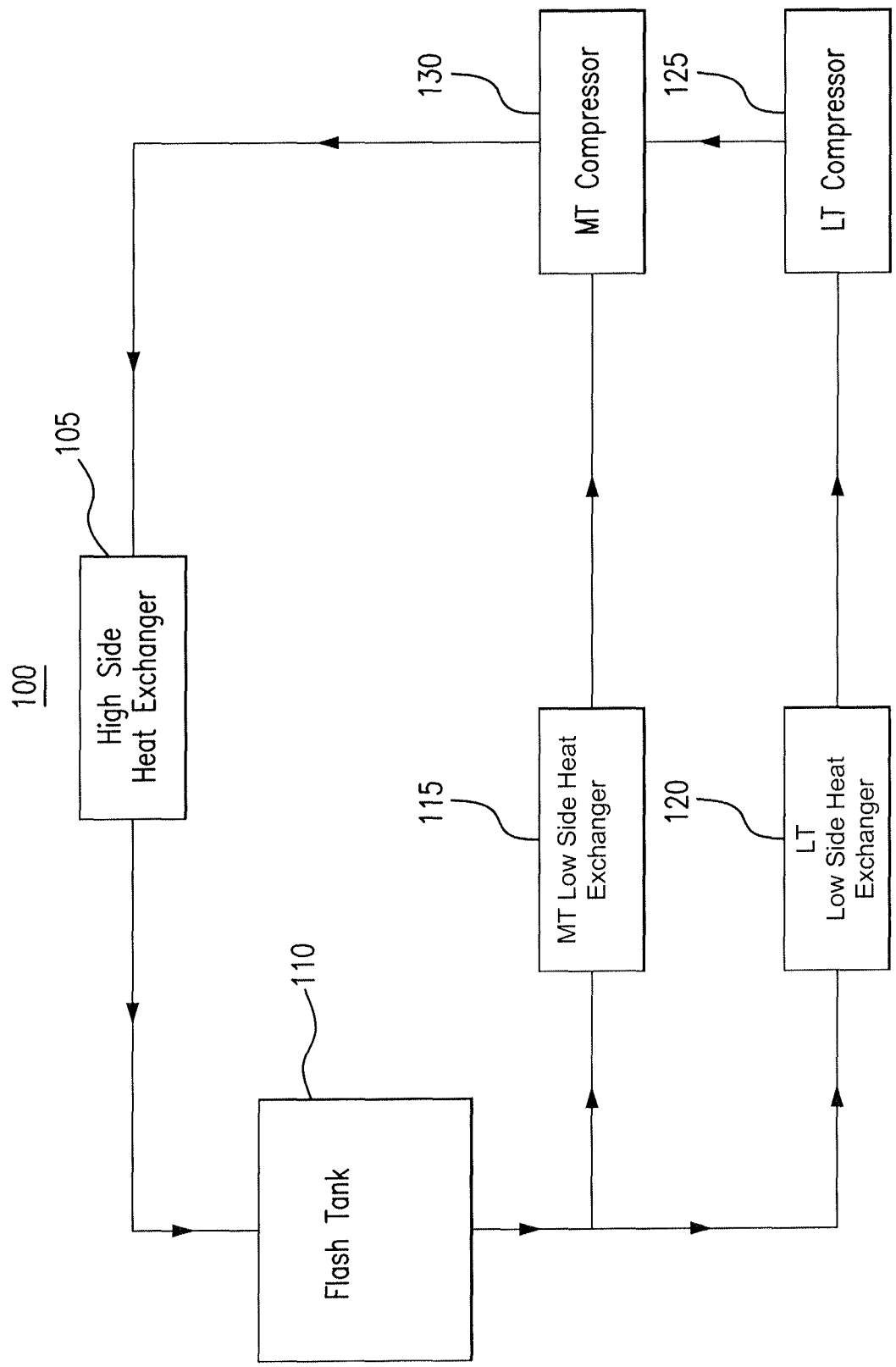
FIG. 1 illustrates an example cooling system.
Figure 2:
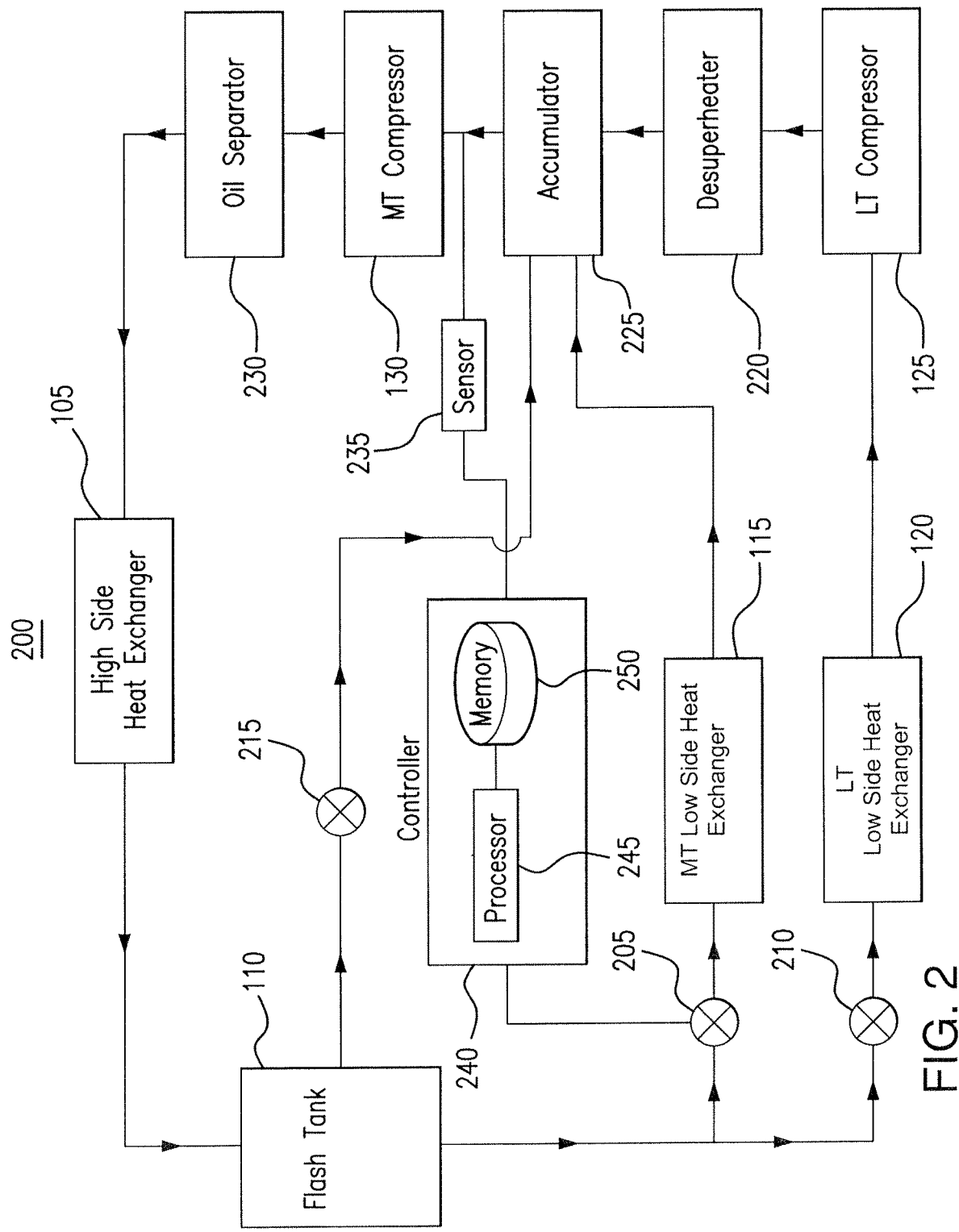
FIG. 2 illustrates an example cooling system.
Figure 3:
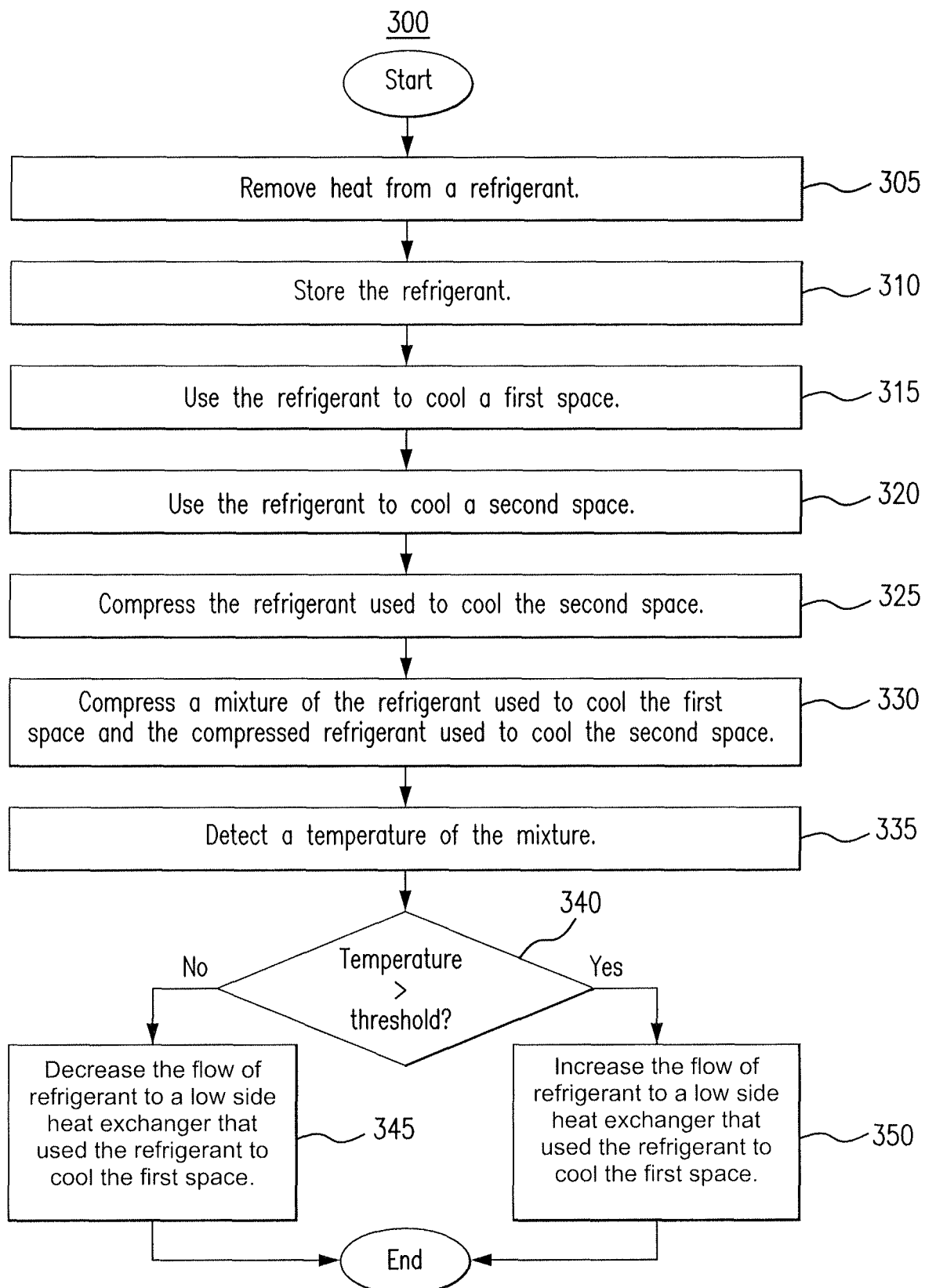
FIG. 3 is a flowchart illustrating a method for operating the cooling system of FIG. 2.

Embodiments of the present disclosure and its advantages are best understood by referring to FIGS. 1 through 3 of the drawings, like numerals being used for like and corresponding parts of the various drawings.

Cooling systems are used to cool spaces, such as residential dwellings, commercial buildings, and/or refrigeration units. These systems cycle a refrigerant (also referred to as charge) that is used to cool the spaces. A typical commercial refrigeration system includes a medium temperature section (e.g., produce shelves) and a low temperature section (e.g., freezers). A low temperature compressor compresses the refrigerant from the low temperature section. A medium temperature compressor compresses a mixture of the refrigerant from the medium temperature section and the compressed refrigerant from the low temperature compressor. Thus, the temperature of the refrigerant from the low temperature section and the temperature of the refrigerant from the medium temperature section affect the temperature of the mixture received at the medium temperature compressor.

A problem occurs in existing systems when the low temperature section is being used much more heavily or frequently than the medium temperature section. In these instances, there is not enough refrigerant from the medium temperature section mixing with the hot refrigerant from the low temperature compressor. As a result, the temperature of the mixture rises, which hurts the performance of the medium temperature compressor.

For example, FIG. 1 illustrates an example cooling system 100. As shown in FIG. 1, system 100 includes a high side heat exchanger 105, a flash tank 110, a medium temperature low side heat exchanger 115, a low temperature low side heat exchanger 120, a low temperature compressor 125, and a medium temperature compressor 130. Generally, these components cycle a refrigerant to cool spaces proximate medium temperature low side heat exchanger 115 and low temperature low side heat exchanger 120.

High side heat exchanger 105 removes heat from a refrigerant. When heat is removed from the refrigerant, the refrigerant is cooled. This disclosure contemplates high side heat exchanger 105 being operated as a condenser and/or a gas cooler. When operating as a condenser, high side heat exchanger 105 cools the refrigerant such that the state of the refrigerant changes from a gas to a liquid. When operating as a gas cooler, high side heat exchanger 105 cools gaseous and/or supercritical refrigerant and the refrigerant remains a gas and/or a supercritical fluid. In certain configurations, high side heat exchanger 105 is positioned such that heat removed from the refrigerant may be discharged into the air. For example, high side heat exchanger 105 may be positioned on a rooftop so that heat removed from the refrigerant may be discharged into the air. As another example, high side heat exchanger 105 may be positioned external to a building and/or on the side of a building.

Flash tank 110 stores refrigerant received from high side heat exchanger 105. This disclosure contemplates flash tank 110 storing refrigerant in any state such as, for example, a liquid state and/or a gaseous state. Refrigerant leaving flash tank 110 is fed to low temperature low side heat exchanger 120 and medium temperature low side heat exchanger 115. In some embodiments, a flash gas and/or a gaseous refrigerant is released from flash tank 110. By releasing flash gas, the pressure within flash tank 110 may be reduced.

System 100 includes a low temperature portion and a medium temperature portion. The low temperature portion typically operates at a lower temperature than the medium temperature portion. In some refrigeration systems, the low temperature portion may be a freezer system and the medium temperature system may be a regular refrigeration system. In a grocery store setting, the low temperature portion may include freezers used to hold frozen foods, and the medium temperature portion may include refrigerated shelves used to hold produce. As seen in FIG. 1, system 100 includes a medium temperature low side heat exchanger 115 and a low temperature low side heat exchanger 120. The medium temperature portion includes medium temperature low side heat exchanger 115, and the low temperature portion includes low temperature low side heat exchanger 120. Each of these low side heat exchangers is used to cool a particular space. For example, medium temperature low side heat exchanger 115 may be a produce shelf in a grocery store and low temperature low side heat exchanger 120 may be a freezer case. Generally, low temperature low side heat exchanger 120 keeps a space cooled to freezing temperatures (e.g., below 32 degrees Fahrenheit) and medium temperature low side heat exchanger 115 keeps a space cooled above freezing temperatures (e.g., above 32 degrees Fahrenheit).

Refrigerant flows from flash tank 110 to both the low temperature and medium temperature portions of the refrigeration system. For example, the refrigerant may flow to low temperature low side heat exchanger 120 and medium temperature low side heat exchanger 115. When the refrigerant reaches low temperature low side heat exchanger 120 or medium temperature low side heat exchanger 115, the refrigerant removes heat from the air around low temperature low side heat exchanger 120 or medium temperature low side heat exchanger 115. As a result, the air is cooled. The cooled air may then be circulated such as, for example, by a fan to cool a space such as, for example, a freezer and/or a refrigerated shelf. As refrigerant passes through low temperature low side heat exchanger 120 and medium temperature low side heat exchanger 115, the refrigerant may change from a liquid state to a gaseous state as it absorbs heat.

Refrigerant flows from low temperature low side heat exchanger 120 and medium temperature low side heat exchanger 115 to compressors 125 and 130. This disclosure contemplates system 100 including any number of low temperature compressors 125 and medium temperature compressors 130. The low temperature compressor 125 and medium temperature compressor 130 may be configured to increase the pressure of the refrigerant. As a result, the heat in the refrigerant may become concentrated and the refrigerant may become a high-pressure gas. Low temperature compressor 125 compresses refrigerant from low temperature low side heat exchanger 120 and sends the compressed refrigerant to medium temperature compressor 130. Medium temperature compressor 130 compresses refrigerant from low temperature compressor 125 and/or medium temperature low side heat exchanger 115. The refrigerant from low temperature compressor 125 mixes with and is cooled by the refrigerant from medium temperature low side heat exchanger 115 before entering medium temperature compressor 130. Medium temperature compressor 130 may then send the compressed refrigerant to high side heat exchanger 105.

A problem occurs in system 100 when low temperature low side heat exchanger 120 is being used much more heavily or frequently than the medium temperature low side heat exchanger 115. In these instances, there is not enough refrigerant from medium temperature low side heat exchanger 115 mixing with the hot refrigerant from low temperature compressor 125. As a result, the temperature of the mixture received at medium temperature compressor 130 may be too hot, which hurts the performance of medium temperature compressor 130.

A problem occurs in system 100 when low temperature load 120 is being used much more heavily or frequently than the medium temperature load 115. In these instances, there is not enough refrigerant from medium temperature load 115 mixing with the hot refrigerant from low temperature compressor 125. As a result, the temperature of the mixture received at medium temperature compressor 130 may be too hot, which hurts the performance of medium temperature compressor 130.

This disclosure contemplates an unconventional cooling system that increases the flow of refrigerant to medium temperature low side heat exchanger 115 when the temperature of the mixture at medium temperature compressor 130 exceeds a threshold. By increasing the flow of refrigerant to medium temperature low side heat exchanger 115, the refrigerant leaving medium temperature low side heat exchanger 115 becomes cooler, especially if medium temperature low side heat exchanger 115 is not being used heavily or frequently. Then, that refrigerant cools the mixture entering medium temperature compressor 130. As a result, the performance of medium temperature compressor 130 is improved. The cooling system will be described in more detail using FIGS. 2 through 3.

FIG. 2 illustrates an example cooling system 200. As seen in FIG. 2, system 200 includes a high side heat exchanger 105, a flash tank 110, a medium temperature low side heat exchanger 115, a low temperature low side heat exchanger 120, a low temperature compressor 125, a medium temperature compressor 130, an expansion valve 205, an expansion valve 210, a bypass valve 215, a de-super heater 220, an accumulator 225, an oil separator 230, a sensor 235, and a controller 240. Generally, system 200 allows for the flow of refrigerant to medium temperature low side heat exchanger 115 to be controlled to cool the refrigerant received at medium temperature compressor 130. As a result, the performance of medium temperature compressor 130 is improved in certain embodiments.

High side heat exchanger 105, flash tank 110, medium temperature low side heat exchanger 115, low temperature low side heat exchanger 120, low temperature compressor 125, and medium temperature compressor 130 operate similarly as they did in system 100. For example, high side heat exchanger 105 removes heat from a refrigerant. Flash tank 110 stores refrigerant. Medium temperature low side heat exchanger 115 and low temperature low side heat exchanger 120 use the refrigerant to cool spaces proximate medium temperature load 115 and low temperature low side heat exchanger 120. Low temperature compressor 125 compresses the refrigerant from low temperature low side heat exchanger 120. Medium temperature compressor 130 compresses the refrigerant from medium temperature low side heat exchanger 115 and low temperature compressor 125.

In certain embodiments, to improve the performance of medium temperature compressor 130, controller 240 controls expansion valve 205 in response to a temperature of the refrigerant received at medium temperature compressor 130. For example, if that temperature is above a threshold, then controller 240 may control expansion valve 205 to allow more refrigerant to flow to medium temperature low side heat exchanger 115. As a result, the refrigerant leaving medium temperature low side heat exchanger 115 is cooler, and thus, provides more cooling to the mixture received at medium temperature compressor 130. When medium temperature compressor 130 receives the cooler mixture, the performance of medium temperature compressor 130 improves.

Expansion valves 205 and 210 control a flow of refrigerant to medium temperature low side heat exchanger 115 and low temperature low side heat exchanger 120, respectively. For example, when expansion valve 205 is opened, refrigerant flows to medium temperature low side heat exchanger 115. When expansion valve 205 is closed, refrigerant stops flowing to medium temperature low side heat exchanger 115. When expansion valve 210 is opened, refrigerant flows to low temperature low side heat exchanger 120. When expansion valve 210 is closed, refrigerant stops flowing to low temperature low side heat exchanger 120. In certain embodiments, expansion valves 205 and 210 can be opened to varying degrees to adjust the amount of flow of refrigerant to medium temperature low side heat exchanger 115 and low temperature low side heat exchanger 120. For example, expansion valves 205 and 210 may be opened more to increase the flow of refrigerant to medium temperature low side heat exchanger 115 and low temperature low side heat exchanger 120. As another example, expansion valves 205 and 210 may be opened less to decrease the flow of refrigerant to medium temperature low side heat exchanger 115 and low temperature low side heat exchanger 120.

Expansion valves 205 and 210 are used to cool refrigerant entering low side heat exchangers 115 and 120. Expansion valves 205 and 210 may receive refrigerant from any component of system 100 such as for example high side heat exchanger 105 and/or flash tank 110. Expansion valves 205 and 210 reduce the pressure and therefore the temperature of the refrigerant. Expansion valves 205 and 210 reduce pressure from the refrigerant flowing into the expansion valves 205 and 210. The temperature of the refrigerant may then drop as pressure is reduced. As a result, refrigerant entering expansion valves 205 and 210 may be cooler when leaving expansion valves 205 and 210. The refrigerant leaving expansion valve 205 is fed to low side heat exchanger 115. The refrigerant leaving expansion valve 210 is fed to low side heat exchanger 120.

Bypass valve 215 controls a flow of flash gas from flash tank 110 to medium temperature compressor 130. When bypass valve 215 is opened, flash gas can leave flash tank 110 and flow to medium temperature compressor 130. In this manner, the pressure within flash tank 110 is reduced and the mixture received at medium temperature compressor 130 may be cooled by the flash gas. This disclosure contemplates bypass valve 215 being opened more or less to adjust the flow of flash gas out of flash tank 110. For example, bypass valve 215 can be opened more to increase the flow of flash gas, and bypass valve 215 can be opened less to decrease the flow of flash gas.

Desuperheater 220 removes heat from the refrigerant leaving low temperature compressor 125. Desuperheater 220 removes heat from the refrigerant compressed by low temperature compressor 125 before that refrigerant reaches medium temperature compressor 130. By removing heat from that refrigerant, desuperheater 220 allows medium temperature compressor 130 to operate more efficiently and effectively. Certain embodiments may not include desuperheater 220. In these embodiments, the refrigerant leaving low temperature compressor 125 flows directly to accumulator 225 and/or medium temperature compressor 130.

Accumulator 225 converts liquid refrigerant into a gas. Accumulator 225 receives refrigerant from medium temperature low side heat exchanger 115, low temperature compressor 125, and/or desuperheater 220. Additionally, accumulator 225 may receive refrigerant in the form of flash gas from flash tank 110. Accumulator 225 may convert any liquid portion of this received refrigerant into a gas before directing that refrigerant to medium temperature compressor 130. In this manner, accumulator 225 protects medium temperature compressor 130 from liquid entering (also referred to as "flooding") medium temperature compressor 130. When liquid enters medium temperature compressor 130, the liquid may flood and damage the compressor. By converting liquid refrigerant into gas, accumulator 225 protects medium temperature compressor 130 and other components of system 200 from flooding. Certain embodiments do not include accumulator 225. In those embodiments, refrigerant from medium temperature low side heat exchanger 115, low temperature compressor 125, desuperheater 220, and/or flash tank 110 flow directly to medium temperature compressor 130.

Oil separator 230 receives refrigerant from medium temperature compressor 130. Oil separator 230 separates oil that may have mixed with the refrigerant. The oil may have mixed with the refrigerant in low temperature compressor 125 and/or medium temperature compressor 130. By separating the oil from the refrigerant, oil separator 230 protects other components of system 200 from being clogged and/or damaged by the oil. Oil separator 230 may collect the separated oil. The oil may then be removed from oil separator 230 and added back to low temperature compressor 125 and/or medium temperature compressor 130. Certain embodiments do not include oil separator 230. In these embodiments, refrigerant from medium temperature compressor 130 flows directly to high side heat exchanger 105.

Sensor 235 detects the temperature of the refrigerant mixture received at medium temperature compressor 130. Sensor 235 then reports the detected temperature to controller 240. Based on that detected temperature, controller 240 adjusts the flow of refrigerant to medium temperature low side heat exchanger 115. This disclosure contemplates sensor 235 being any suitable sensor. For example, sensor 235 may be a temperature sensor that detects a temperature. Additionally, sensor 235 may also include a pressure sensor that detects a pressure of the refrigerant mixture received at medium temperature compressor 130.

Controller 240 includes processor 245 and memory 250. This disclosure contemplates processor 245 and memory 250 being configured to perform and of the functions of controller 240 described herein. Generally, controller 240 controls expansion valve 205 to adjust the flow of refrigerant to medium temperature low side heat exchanger 115.

Processor 245 is any electronic circuitry, including, but not limited to microprocessors, application specific integrated circuits (ASIC), application specific instruction set processor (ASIP), and/or state machines, that communicatively couples to memory 250 and controls the operation of controller 240. Processor 245 may be 8-bit, 16-bit, 32-bit, 64-bit or of any other suitable architecture. Processor 245 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 245 may include other hardware and software that operates to control and process information. Processor 245 executes software stored on memory 250 to perform any of the functions described herein. Processor 245 controls the operation and administration of controller 240 by processing information received from various components of system 200. Processor 245 may be a programmable logic device, a microcontroller, a microprocessor, any suitable processing device, or any suitable combination of the preceding. Processor 245 is not limited to a single processing device and may encompass multiple processing devices.

Memory 250 may store, either permanently or temporarily, data, operational software, or other information for processor 245. Memory 250 may include any one or a combination of volatile or non-volatile local or remote devices suitable for storing information. For example, memory 250 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 250, a disk, a CD, or a flash drive. In particular embodiments, the software may include an application executable by processor 245 to perform one or more of the functions of controller 240 described herein.

Controller 240 receives a detected temperature from sensor 235. The detected temperature may be the temperature of a refrigerant mixture received at medium temperature compressor 130. If the temperature of that mixture is too high, then the performance of medium temperature compressor 130 may be negatively affected. To improve the performance of medium temperature compressor 130, controller 240 may adjust the flow of refrigerant to medium temperature low side heat exchanger 115 to cool the mixture received at medium temperature compressor 130.

Controller 240 compares the received temperature to a threshold. Based on that comparison, controller 240 adjusts the flow of refrigerant to medium temperature low side heat exchanger 115. For example, if the temperature exceeds the threshold, controller 240 may open expansion valve 205 more to increase the flow of refrigerant to medium temperature low side heat exchanger 115. As a result, the refrigerant leaving medium temperature low side heat exchanger 115 cools and thus, cools the mixture received at medium temperature compressor 130. When the temperature of the mixture received at medium temperature compressor 130 cools so that it falls below the threshold, controller 240 may adjust expansion valve 205 to decrease the flow of refrigerant to medium temperature low side heat exchanger 115. In certain embodiments, the threshold is adjusted based on the particular operating parameters of medium temperature compressor 130. For example, the threshold may be set relative to a saturation temperature of a refrigerant received at medium temperature compressor 130 (e.g., 15 degrees Fahrenheit over the saturation temperature of the refrigerant). When the detected temperature of the refrigerant exceeds the threshold, controller 240 increases the flow of refrigerant to medium temperature low side heat exchanger 115. This disclosure contemplates the threshold being set at any appropriate temperature.

Controller 240 adjusts expansion valve 205 to control the flow of refrigerant to medium temperature low side heat exchanger 115. For example, controller 240 may open expansion valve 205 more when the detected temperature of the refrigerant mixture received at medium temperature compressor 130 exceeds a threshold. By opening expansion valve 205 more, the flow of refrigerant to medium temperature low side heat exchanger 115 is increased. By increasing the flow of refrigerant to medium temperature low side heat exchanger 115, the temperature of the refrigerant leaving medium temperature low side heat exchanger 115 cools. In certain embodiments, the temperature of the refrigerant leaving medium temperature low side heat exchanger 115 may be reduced close to the saturation temperature of the refrigerant (e.g., the temperature of the refrigerant may be reduced to 1.8 degrees Fahrenheit over the saturation temperature of the refrigerant). When the temperature of the refrigerant leaving medium temperature low side heat exchanger 115 is cooled, that refrigerant cools the resulting mixture received at medium temperature compressor 130, thereby improving the performance of medium temperature compressor 130 in certain embodiments. When the temperature of the mixture received at medium temperature compressor 130 falls sufficiently relative to a threshold (e.g. falls below the threshold), controller 240 may adjust expansion valve 205 to decrease the flow of refrigerant to medium temperature low side heat exchanger 115. In this manner, controller 240 adjusts expansion valve 205 to cool the refrigerant mixture received at medium temperature compressor 130. As a result, the performance of medium temperature compressor 130 is improved in certain embodiments.

FIG. 3 is a flowchart illustrating a method 300 for operating the cooling system 200 of FIG. 2. In particular embodiments, various components of system 200 perform the steps of method 300. By performing method 300, the performance of a medium temperature compressor in system 200 is improved.

A high side heat exchanger begins by removing heat from a refrigerant in step 305. A flash tank stores the refrigerant in step 310. A medium temperature low side heat exchanger uses the refrigerant to cool a first space in step 315. In step 320, a low temperature low side heat exchanger uses the refrigerant to cool a second space. A low temperature compressor then compresses the refrigerant used to cool the second space in step 325.

In step 330, a medium temperature compressor compresses a mixture of the refrigerant used to cool the first space and the compressed refrigerant used to cool the second space. The compressed refrigerant used to cool the second space may come from the low temperature compressor that compressed the refrigerant in step in 325. A sensor detects a temperature of the mixture in step 335.

In step 340, a controller compares the detected temperature to a threshold. If the temperature exceeds the threshold, the controller increases the flow of refrigerant to a low side heat exchanger that used the refrigerant to cool the first space in step 350. For example, the controller may increase the flow of refrigerant to a medium temperature low side heat exchanger. In this manner, the refrigerant leaving the medium temperature low side heat exchanger is cooled, thereby cooling the mixture received at the medium temperature compressor. If the temperature does not exceed the threshold in step 340, then the controller may decrease the flow of refrigerant to a low side heat exchanger that used the refrigerant to cool the first space in step 345. For example, the controller may decrease the flow of refrigerant to the medium temperature low side heat exchanger.

Modifications, additions, or omissions may be made to method 300 depicted in FIG. 3. Method 300 may include more, fewer, or other steps. For example, steps may be performed in parallel or in any suitable order. While discussed as system 200 (or components thereof) performing the steps, any suitable component of system 200 may perform one or more steps of the method.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a flash tank, wherein the apparatus is configured such that the flash tank can store a refrigerant;
a high side heat exchanger, wherein the apparatus is configured such that the high side heat exchanger can remove heat from the refrigerant;
a first low side heat exchanger, wherein the apparatus is configured such that the first low side heat exchanger can use the refrigerant from the flash tank to cool a space proximate the first low side heat exchanger;
a second low side heat exchanger, wherein the apparatus is configured such that the second low side heat exchanger can use the refrigerant from the flash tank to cool a space proximate the second low side heat exchanger;
a first compressor, wherein the apparatus is configured such that the first compressor can compress the refrigerant from the second low side heat exchanger;
a second compressor, wherein the apparatus is configured such that the second compressor can compress a mixture of the refrigerant from the first low side heat exchanger, refrigerant from a bypass valve, and the refrigerant from the first compressor, wherein the high side heat exchanger is disposed between the flash tank and the second compressor;
a desuperheater disposed between the first compressor and the second compressor, wherein the apparatus is configured such that the desuperheater can remove heat from the refrigerant discharged from the first compressor;
a first expansion valve, wherein the apparatus is configured such that the first expansion valve can control a flow of the refrigerant from the flash tank to the first low side heat exchanger;
a second expansion valve, wherein the apparatus is configured such that the second expansion valve can control a flow of the refrigerant from the flash tank to the second low side heat exchanger;
the bypass valve, wherein the apparatus is configured such that the bypass valve can control a flow of the refrigerant from the flash tank to a suction side of the second compressor;
an accumulator disposed between the desuperheater and the second compressor, wherein the bypass valve and the first low side heat exchanger are disposed between the accumulator and the flash tank, the accumulator operable to receive refrigerant from the first low side heat exchanger, the desuperheater, and the bypass valve and to convert the received refrigerant from a liquid to a gas;
a sensor, wherein the apparatus is configured such that the sensor can detect a temperature of the mixture received at the second compressor; and
a controller operable to:
determine that the detected temperature exceeds a threshold; and in response to determining that the detected temperature exceeds the threshold:
maintain the second expansion valve in an open position;
open the first expansion valve such that the flow of refrigerant from the flash tank to the first low side heat exchanger increases; and
actuate the bypass valve to open to allow for the flow of refrigerant from the flash tank to the suction side of the second compressor, wherein the flow of refrigerant from the flash tank to the second low side heat exchanger decreases in response to opening the first expansion valve and the bypass valve;
wherein the temperature of the mixture received at the second compressor decreases based on a reduction in the flow of refrigerant from the flash tank to the second low side heat exchanger and an increase in the flow of refrigerant from the flash tank to the first low side heat exchanger and from the flash tank to the suction side of the second compressor via the bypass valve.

2. The apparatus of claim 1, wherein the apparatus is configured such that the flow of refrigerant from the flash tank to the suction side of the second compressor is a flow of a flash gas from the flash tank.

3. The apparatus of claim 1, wherein the apparatus is further configured such that the controller can:
determine that the detected temperature falls below the threshold; and
in response to determining that the detected temperature falls below the threshold, adjust the first expansion valve such that the flow of refrigerant from the flash tank to the first low side heat exchanger decreases.

4. The apparatus of claim 1, wherein the threshold is 15 degrees Fahrenheit over a saturation temperature of the mixture received at the second compressor.

5. The apparatus of claim 1, further comprising an oil separator disposed downstream from the second compressor, wherein the apparatus is configured such that the oil separator can separate oil from the refrigerant.

6. A method comprising:
storing, by a flash tank, a refrigerant;
removing, by a high side heat exchanger disposed upstream of the flash tank, heat from the refrigerant;
using, by a first low side heat exchanger, the refrigerant from the flash tank to cool a space proximate the first low side heat exchanger;
using, by a second low side heat exchanger, the refrigerant from the flash tank to cool a space proximate the second low side heat exchanger;
compressing, by a first compressor, the refrigerant from the second low side heat exchanger;
compressing, by a second compressor, a mixture of the refrigerant from the first low side heat exchanger, refrigerant from a bypass valve, and the refrigerant from the first compressor, wherein the high side heat exchanger is disposed between the flash tank and the second compressor;
removing, by a desuperheater disposed between the first compressor and the second compressor, heat from the refrigerant discharged from the first compressor;
converting, in an accumulator disposed between the desuperheater and the second compressor, the mixture from a liquid to a gas before the mixture enters the second compressor, wherein the bypass valve and the first low side heat exchanger are disposed between the accumulator and the flash tank;
controlling, by a first expansion valve, a flow of the refrigerant from the flash tank to the first low side heat exchanger;
controlling, by a second expansion valve, a flow of the refrigerant from the flash tank to the second low side heat exchanger;
detecting, by a sensor, a temperature of the mixture received at the second compressor;
determining, by a controller, that the detected temperature exceeds a threshold;
in response to determining that the detected temperature exceeds the threshold:
maintaining the second expansion valve in an open position;
opening, by the controller, the first expansion valve such that the flow of refrigerant from the flash tank to the first low side heat exchanger increases; and
actuating, by the controller, the bypass valve to open to allow for the flow of refrigerant from the flash tank to a suction side of the second compressor, wherein the flow of refrigerant from the flash tank to the second low side heat exchanger decreases in response to opening the first expansion valve and the bypass valve;
wherein the temperature of the mixture received at the second compressor decreases based on a reduction in the flow of refrigerant from the flash tank to the second low side heat exchanger and an increase in the flow of refrigerant from the flash tank to the first low side heat exchanger and from the flash tank to the suction side of the second compressor via the bypass valve.

7. The method of claim 6, further comprising compressing, by the second compressor, the flow of refrigerant from the flash tank, wherein the flow of refrigerant from the flash tank is a flash gas from the flash tank.

8. The method of claim 6, further comprising:
determining, by the controller, that the detected temperature falls below the threshold; and
in response to determining that the detected temperature falls below the threshold, adjusting, by the controller, the first expansion valve such that the flow of refrigerant from the flash tank to the first low side heat exchanger decreases.

9. The method of claim 6, wherein the threshold is 15 degrees Fahrenheit over a saturation temperature of the mixture received at the second compressor.

10. The method of claim 6, further comprising separating, by an oil separator disposed downstream of the second compressor, oil from the refrigerant.

* * * * *